US010470247B2

(12) United States Patent
Everly et al.

(10) Patent No.: US 10,470,247 B2
(45) Date of Patent: Nov. 5, 2019

(54) SUSCEPTOR FOR USE IN A FLUID FLOW SYSTEM

(71) Applicant: WATLOW ELECTRIC MANUFACTURING COMPANY, St. Louis, MO (US)

(72) Inventors: Mark D. Everly, St. Charles, MO (US); Richard T. Williams, Genoa City, WI (US); James N. Pradun, Lake Geneva, WI (US)

(73) Assignee: WATLOW ELECTRIC MANUFACTURING COMPANY, St. Louis, MO (US)

( * ) Notice: Subject to any disclaimer, the term of this patent is extended or adjusted under 35 U.S.C. 154(b) by 85 days.

(21) Appl. No.: 15/448,108

(22) Filed: Mar. 2, 2017

(65) Prior Publication Data

US 2017/0254249 A1    Sep. 7, 2017

Related U.S. Application Data

(60) Provisional application No. 62/302,482, filed on Mar. 2, 2016.

(51) Int. Cl.
*F01N 9/00* (2006.01)
*H05B 1/02* (2006.01)
(Continued)

(52) U.S. Cl.
CPC ........... *H05B 1/0244* (2013.01); *F01N 3/023* (2013.01); *F01N 3/027* (2013.01); *F01N 3/2006* (2013.01);
(Continued)

(58) Field of Classification Search
CPC .. F01N 11/002; F01N 11/005; F01N 13/0097; F01N 3/023; F01N 3/027;
(Continued)

(56) References Cited

U.S. PATENT DOCUMENTS 1,366,519 A * 1/1921 Carmean ............... F24H 3/0417
338/318
2,091,905 A * 8/1937 Arlington ................ H05B 3/50
219/449.1
(Continued)

FOREIGN PATENT DOCUMENTS

DE         19720205      11/1998
DE       102004052107     5/2006
(Continued)

OTHER PUBLICATIONS

ISRWO of PCT/US2017/020518 dated May 2, 2017.

*Primary Examiner* — Jason D Shanske
*Assistant Examiner* — Matthew T Largi
(74) *Attorney, Agent, or Firm* — Burris Law, PLLC

(57) ABSTRACT

A susceptor for use in a heated fluid flow system is provided. In one form, a susceptor is arranged within a conduit and adapted to absorb radiant energy from at least one heating element and inhibit the radiant energy from being absorbed by the at least one wall of the conduit and/or other components. In another form, the susceptor absorbs and inhibits the radiant energy from being absorbed by the outer wall of the conduit.

20 Claims, 4 Drawing Sheets

(51) Int. Cl.

| | | |
|---|---|---|
| *F01N 3/20* | (2006.01) | |
| *F02D 41/22* | (2006.01) | |
| *G01M 15/05* | (2006.01) | |
| *G07C 5/08* | (2006.01) | |
| *H05B 3/20* | (2006.01) | |
| *H05B 3/40* | (2006.01) | |
| *G01K 7/16* | (2006.01) | |
| *G05D 23/24* | (2006.01) | |
| *G05D 23/30* | (2006.01) | |
| *H05B 3/14* | (2006.01) | |
| *G01F 1/86* | (2006.01) | |
| *H05B 3/18* | (2006.01) | |
| *F01N 11/00* | (2006.01) | |
| *H05B 3/00* | (2006.01) | |
| *F01N 3/023* | (2006.01) | |
| *F01N 3/027* | (2006.01) | |
| *G01F 1/68* | (2006.01) | |
| *F01N 13/00* | (2010.01) | |
| *G05D 23/185* | (2006.01) | |
| *F02D 41/02* | (2006.01) | |
| *F02D 41/14* | (2006.01) | |
| *F01N 3/10* | (2006.01) | |
| *F01N 3/021* | (2006.01) | |
| *F01N 3/08* | (2006.01) | |
| *H01C 7/02* | (2006.01) | |
| *H01C 7/04* | (2006.01) | |

(52) U.S. Cl.
CPC ............ *F01N 3/2013* (2013.01); *F01N 9/00* (2013.01); *F01N 9/002* (2013.01); *F01N 11/002* (2013.01); *F01N 11/005* (2013.01); *F01N 13/0097* (2014.06); *F02D 41/024* (2013.01); *F02D 41/1446* (2013.01); *F02D 41/1447* (2013.01); *F02D 41/22* (2013.01); *F02D 41/222* (2013.01); *G01F 1/68* (2013.01); *G01F 1/86* (2013.01); *G01K 7/16* (2013.01); *G01M 15/05* (2013.01); *G05D 23/185* (2013.01); *G05D 23/2401* (2013.01); *G05D 23/30* (2013.01); *G07C 5/0808* (2013.01); *H05B 1/0227* (2013.01); *H05B 3/0042* (2013.01); *H05B 3/141* (2013.01); *H05B 3/18* (2013.01); *H05B 3/20* (2013.01); *H05B 3/40* (2013.01); *F01N 3/021* (2013.01); *F01N 3/0814* (2013.01); *F01N 3/103* (2013.01); *F01N 3/106* (2013.01); *F01N 3/2066* (2013.01); *F01N 2240/10* (2013.01); *F01N 2240/16* (2013.01); *F01N 2240/36* (2013.01); *F01N 2410/00* (2013.01); *F01N 2410/04* (2013.01); *F01N 2550/22* (2013.01); *F01N 2560/06* (2013.01); *F01N 2560/07* (2013.01); *F01N 2560/12* (2013.01); *F01N 2560/20* (2013.01); *F01N 2610/102* (2013.01); *F01N 2900/0416* (2013.01); *F01N 2900/1404* (2013.01); *F01N 2900/1406* (2013.01); *F01N 2900/1411* (2013.01); *F01N 2900/1602* (2013.01); *F02D 2041/1433* (2013.01); *F02D 2041/228* (2013.01); *F28F 2200/00* (2013.01); *G01K 2205/04* (2013.01); *H01C 7/02* (2013.01); *H01C 7/04* (2013.01); *H05B 2203/019* (2013.01); *H05B 2203/021* (2013.01); *H05B 2203/022* (2013.01); *Y02T 10/26* (2013.01); *Y02T 10/47* (2013.01)

(58) Field of Classification Search
CPC ........ F01N 3/2006; F01N 3/2013; F01N 9/00; F01N 9/002; F02D 41/22; F02D 41/222; G01F 1/68; G01F 1/86; G01K 13/00; G01K 7/00; G01K 7/16; G01M 15/05; G05D 23/2401

See application file for complete search history.

(56) References Cited

U.S. PATENT DOCUMENTS

| | | | | |
|---|---|---|---|---|
| 2,900,483 A * | 8/1959 | Welch | ............... | B01J 12/005 219/201 |
| 3,176,117 A * | 3/1965 | Knoll | ............... | F24H 3/0411 165/121 |
| 4,211,075 A * | 7/1980 | Ludecke | ............... | F01N 3/023 60/285 |
| 4,523,935 A * | 6/1985 | Takagi | ............... | B01D 39/2093 219/205 |
| 4,730,454 A * | 3/1988 | Pischinger | ............... | F01N 3/023 55/302 |
| 4,744,216 A * | 5/1988 | Rao | ............... | F01N 3/0222 422/174 |
| 5,233,970 A | 8/1993 | Harris | | |
| 5,259,190 A * | 11/1993 | Bagley | ............... | B01D 46/0032 422/174 |
| 5,465,573 A * | 11/1995 | Abe | ............... | F01N 3/2026 219/205 |
| 5,597,503 A * | 1/1997 | Anderson | ............... | F01N 3/2026 219/552 |
| 5,697,155 A * | 12/1997 | Bloecker | ............... | B21C 37/292 29/421.1 |
| 5,716,133 A | 2/1998 | Hosokawa et al. | | |
| 6,310,327 B1 | 10/2001 | Moore et al. | | |
| 6,373,033 B1 | 4/2002 | de Waard et al. | | |
| 7,251,929 B2 | 8/2007 | Hu et al. | | |
| 7,403,704 B2 | 7/2008 | Eccleston et al. | | |
| 7,434,387 B2 | 10/2008 | Yan | | |
| 7,554,063 B2 * | 6/2009 | Hess | ............... | F24H 3/0417 219/392 |
| 8,209,960 B2 | 7/2012 | Shamis et al. | | |
| 8,361,422 B2 | 1/2013 | Soukhojak et al. | | |
| 8,652,259 B2 | 2/2014 | Poppe et al. | | |
| 9,212,422 B2 | 12/2015 | Higashi et al. | | |
| 2002/0139114 A1 | 10/2002 | Dickau | | |
| 2005/0115224 A1* | 6/2005 | Kojima | ............... | F01N 3/0211 60/282 |
| 2006/0153761 A1* | 7/2006 | Bandl-Konrad | ... | B01D 53/9431 423/239.1 |
| 2006/0177358 A1* | 8/2006 | Lee | ............... | B01D 53/9454 422/174 |
| 2008/0028753 A1* | 2/2008 | Wagner | ............... | F01N 3/0238 60/295 |
| 2010/0319331 A1 | 12/2010 | Wagner et al. | | |
| 2011/0214569 A1* | 9/2011 | Gonze | ............... | B01D 46/00 95/278 |
| 2012/0144812 A1 | 6/2012 | Hyun | | |
| 2012/0198821 A1 | 8/2012 | Soukhojak et al. | | |
| 2013/0081626 A1 | 4/2013 | Pujol et al. | | |
| 2013/0305698 A1* | 11/2013 | Yoshioka | ............... | F01N 3/2026 60/300 |
| 2014/0190151 A1* | 7/2014 | Culbertson | ............... | F01N 3/26 60/303 |
| 2015/0143811 A1 | 5/2015 | Pang et al. | | |
| 2015/0247651 A1 | 9/2015 | Hariu et al. | | |

FOREIGN PATENT DOCUMENTS

| | | |
|---|---|---|
| DE | 102012111335 | 5/2013 |
| FR | 3014136 | 6/2015 |
| GB | 2403791 | 1/2005 |
| JP | H110184346 | 7/1998 |
| WO | 2014100118 | 6/2014 |
| WO | 2015/046506 | 4/2015 |
| WO | 2016/009259 | 1/2016 |

* cited by examiner

SUSCEPTOR FOR USE IN A FLUID FLOW SYSTEM

CROSS-REFERENCE TO RELATED APPLICATIONS

This application claims priority to and the benefit of U.S. provisional application Ser. No. 62/302,482, filed on Mar. 2, 2016, the contents of which are incorporated herein by reference in their entirety. This application is also related to co-pending applications titled "Bare Heating Elements for Heating Fluid Flows," "Virtual Sensing System," "Advanced Two-Wire Heater System for Transient Systems," "Heater Element Having Targeted Decreasing Temperature Resistance Characteristics," "System and Method for Axial Zoning of Heating Power," "Dual-Purpose Heater and Fluid Flow Measurement System," "Heater-Actuated Flow Bypass," and "Thermal Storage Device for Use in a Fluid Flow System," concurrently filed herewith and commonly assigned with the present application, the contents of which are incorporated herein by reference in their entirety.

FIELD

The present disclosure relates to heating and sensing systems for fluid flow applications, for example vehicle exhaust systems, such as diesel exhaust and aftertreatment systems.

BACKGROUND

The statements in this section merely provide background information related to the present disclosure and may not constitute prior art.

The use of physical sensors in transient fluid flow applications such as the exhaust system of an engine is challenging due to harsh environmental conditions such as vibration and thermal cycling. One known temperature sensor includes a mineral insulated sensor inside a thermowell that is then welded to a support bracket, which retains a tubular element. This design, unfortunately, takes a long amount of time to reach stability, and high vibration environments can result in damage to physical sensors.

Physical sensors also present some uncertainty of the actual resistive element temperature in many applications, and as a result, large safety margins are often applied in the design of heater power. Accordingly, heaters that are used with physical sensors generally provide lower watt density, which allows a lower risk of damaging the heater at the expense of greater heater size and cost (same heater power spread over more resistive element surface area).

Moreover, known technology uses an on/off control or PID control from an external sensor in a thermal control loop. External sensors have inherent delays from thermal resistances between their wires and sensor outputs. Any external sensor increases the potential for component failure modes and sets limitations of the any mechanical mount to the overall system.

One application for heaters in fluid flow systems is vehicle exhausts, which are coupled to an internal combustion engine to assist in the reduction of an undesirable release of various gases and other pollutant emissions into the atmosphere. These exhaust systems typically include various after-treatment devices, such as diesel particulate filters (DPF), a catalytic converter, selective catalytic reduction (SCR), a diesel oxidation catalyst (DOC), a lean $NO_x$ trap (LNT), an ammonia slip catalyst, or reformers, among others. The DPF, the catalytic converter, and the SCR capture carbon monoxide (CO), nitrogen oxides ($NO_x$), particulate matters (PMs), and unburned hydrocarbons (HCs) contained in the exhaust gas. The heaters may be activated periodically or at a predetermined time to increase the exhaust temperature and activate the catalysts and/or to burn the particulate matters or unburned hydrocarbons that have been captured in the exhaust system.

The heaters are generally installed in exhaust pipes or components such as containers of the exhaust system. The heaters may include a plurality of heating elements within the exhaust pipe and are typically controlled to the same target temperature to provide the same heat output. However, a temperature gradient typically occurs because of different operating conditions, such as different heat radiation from adjacent heating elements, and exhaust gas of different temperature that flows past the heating elements. For example, the downstream heating elements generally have a higher temperature than the upstream elements because the downstream heating elements are exposed to fluid having a higher temperature that has been heated by the upstream heating elements. Moreover, the middle heating elements receive more heat radiation from adjacent upstream and downstream heating elements.

The life of the heater depends on the life of the heating element that is under the harshest heating conditions and that would fail first. It is difficult to predict the life of the heater without knowing which heating element would fail first. To improve reliability of all the heating elements, the heater is typically designed to be operated with a safety factor to avoid failure of any of the heating elements. Therefore, the heating elements that are under the less harsh heating conditions are typically operated to generate a heat output that is much below their maximum available heat output.

SUMMARY

In the present disclosure, a device is used in a heated fluid flow to function as a susceptor, namely, to: absorb radiant energy from a heating element that would otherwise be absorbed by other, higher mass system elements; and transfer the absorbed energy to the flow of fluid being heated. Accordingly, the rate of temperature increase can be improved by reducing radiant power absorbed by high mass elements, such as structural elements within the fluid flow system, during warm-up. In one form, a conduit for use in carrying a fluid flow is provided that includes at least one wall defining an outer boundary of the conduit and configured to allow for fluid flow through the conduit. At least one heating element is positioned proximate the heated conduit and is operable for heating the fluid flow. A susceptor is arranged adjacent the heater and is adapted to absorb radiant energy from at least one of the heating elements and inhibit the radiant energy from being absorbed by at least one wall of the conduit.

In another form, a diesel engine exhaust system is provided that includes a conduit adapted to carry exhaust fluid flow. The conduit is positioned upstream from a catalyst system of the diesel exhaust system. The diesel engine exhaust system further includes at least one heating element disposed proximate to an outer wall defining at least a portion of the conduit and a susceptor arranged within the conduit and being adapted to absorb radiant energy from at least one heating element and inhibit the radiant energy from being absorbed by the outer wall of the conduit.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
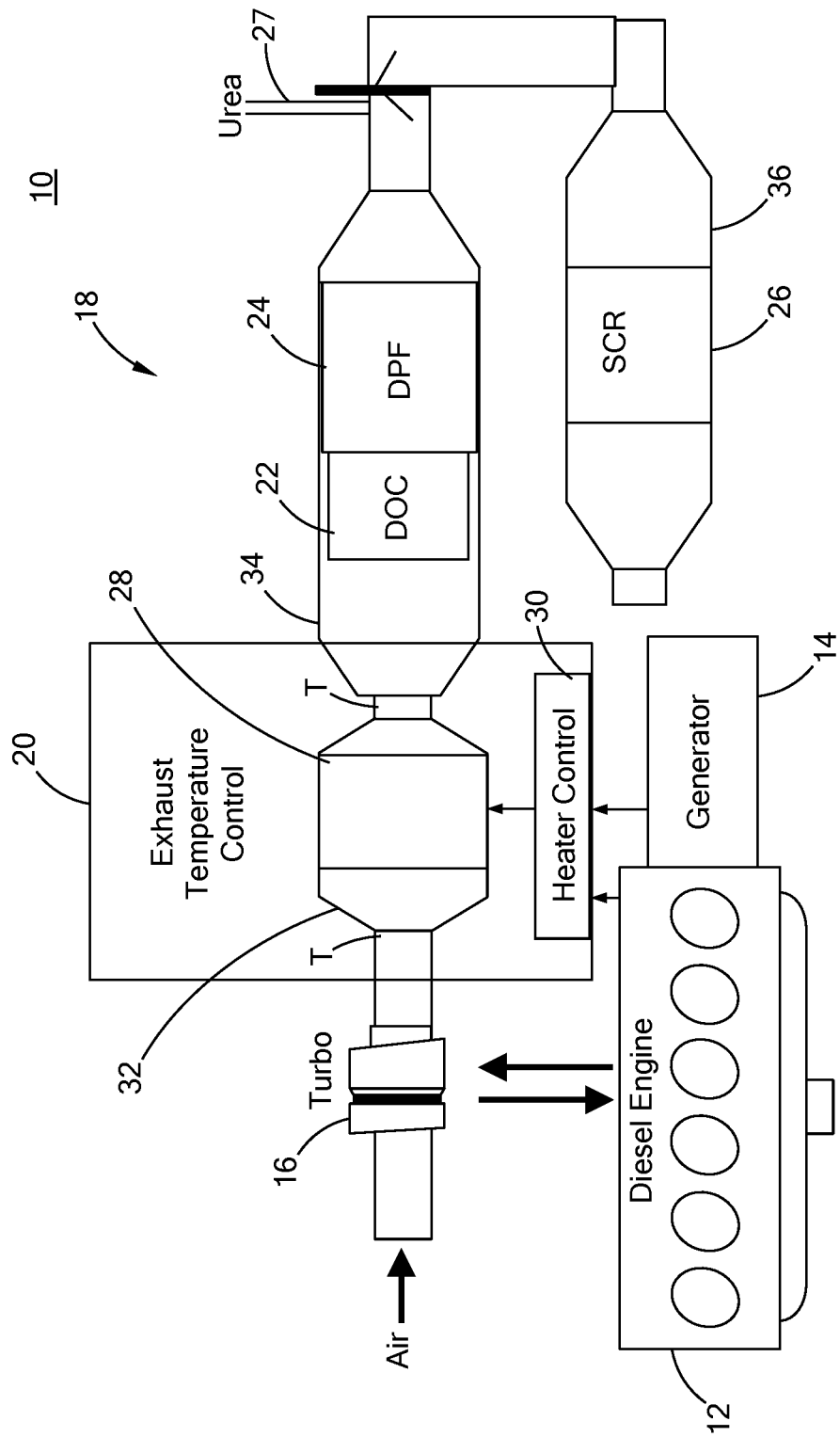
FIG. 1 is a schematic view of exemplary application of a diesel engine and exhaust aftertreatment system in which the principles of the present disclosure are applied.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, an exemplary engine system 10 generally includes a diesel engine 12, an alternator 14 (or generator in some applications), a turbocharger 16, and an exhaust aftertreatment system 18. The exhaust aftertreatment system 18 is disposed downstream from a turbocharger 16 for treating exhaust gases from the diesel engine 12 before the exhaust gases are released to atmosphere. The exhaust aftertreatment system 18 can include one or more additional components, devices, or systems operable to further treat exhaust fluid flow to achieve a desired result. In the example of FIG. 1, the exhaust aftertreatment system 18 includes a heating system 20, a diesel oxidation catalyst (DOC) 22, a diesel particulate filter device (DPF) 24, and a selective catalytic reduction device (SCR) 26. The exhaust aftertreatment system 18 further includes an upstream exhaust conduit 32 that receives a heater assembly 28 therein, an intermediate exhaust conduit 34 in which the DOC 22 and DPF 24 are provided, and a downstream exhaust conduit 36 in which the SCR 26 is disposed.

It should be understood that the engine system 10 illustrated and described herein is merely exemplary, and thus other components such as a $NO_x$ adsorber or ammonia oxidation catalyst, among others, may be included, while other components such as the DOC, DPF, and SCR may not be employed. Although a diesel engine 12 is shown, it should be understood that the teachings of the present disclosure are also applicable to a gasoline engine and other fluid flow applications. Therefore, the diesel engine application should not be construed as limiting the scope of the present disclosure. Such variations should be construed as falling within the scope of the present disclosure.

The heating system 20 includes a heater assembly 28 disposed upstream from the DOC 22, and a heater control module 30 for controlling operation of the heater assembly 28. The heater assembly 28 can include one or more heaters wherein each heater includes at least one resistive heating element. The heater assembly 28 is disposed within an exhaust fluid flow pathway in order to heat the fluid flow during operation. The heater control module 30 typically includes a control device adapted to receive input from the heater assembly 28. Examples of controlling the operation of heater assembly 28 can include turning the heater assembly "on" and "off," modulating power to the heater assembly 28 as a single unit and/or modulating power to separate subcomponents, such as individual or groups of resistive heating elements, if available, and combinations thereof.

In one form, the heater control module 30 includes a control device. The control device is in communication with at least one heater of the heater assembly 28. The control device is adapted to receive at least one input including but not limited to an exhaust fluid flow, mass velocity of an exhaust fluid flow, flow temperature upstream of the at least one electric heater, flow temperature downstream of the at least one electric heater, power input to the at least one electric heater, parameters derived from physical characteristics of the heating system, and combinations thereof. The heater can be any heater suitable to heat an exhaust fluid. Example heaters include but are not limited to a band heater, a bare wire resistive heating element, a cable heater, a cartridge heater, a layered heater, a strip heater, and a tubular heater.

The system of FIG. 1 includes the DOC 22 disposed downstream from the heater assembly 28. The DOC 22 serves as a catalyst to oxidize carbon monoxide and any unburnt hydrocarbons in the exhaust gas. In addition, the DOC 22 converts nitric oxide (NO) into nitrogen dioxide ($NO_2$). The DPF 24 is disposed downstream from the DOC 22 to assist in removing diesel particulate matter (PM) or soot from the exhaust gas. The SCR 26 is disposed downstream from the DPF 24 and, with the aid of a catalyst, converts nitrogen oxides (NOx) into nitrogen ($N_2$) and water. A urea water solution injector 27 is disposed downstream from the DPF 24 and upstream from the SCR 26 for injecting urea water solution into the stream of the exhaust gas.

When urea water solution is used as the reductant in the SCR 26, NOx is reduced into $N_2$, $H_2O$ and $CO_2$.

Figure 2A:
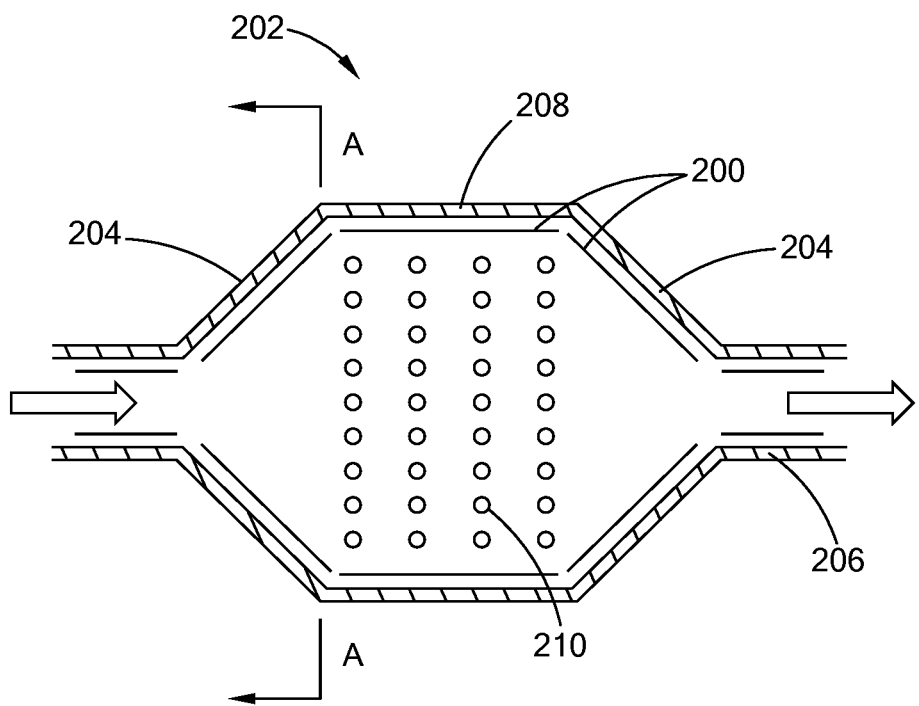
FIG. 2A is a side cross-sectional view illustrating one form of a susceptor installed within a heated fluid flow application according to the teachings of the present disclosure.
Figure 2B:
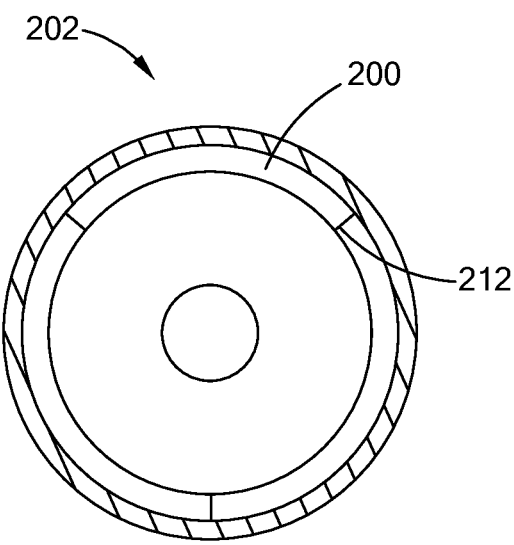
FIG. 2B is a front cross-sectional view illustrating the susceptor of FIG. 2A according to the teachings of the present disclosure.
Figure 3:
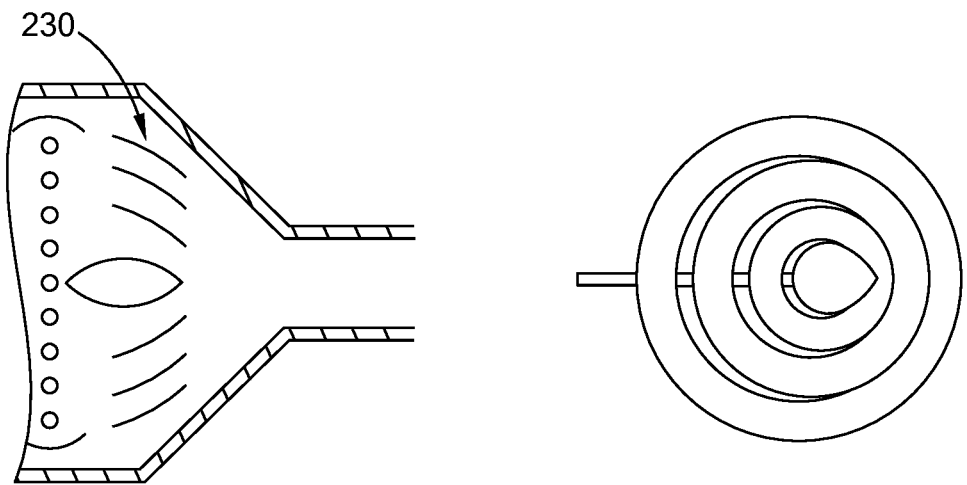
FIG. 3 is a side cross-sectional view illustrating another form of a susceptor installed within a heated fluid flow application according to the teachings of the present disclosure.
Figure 4:
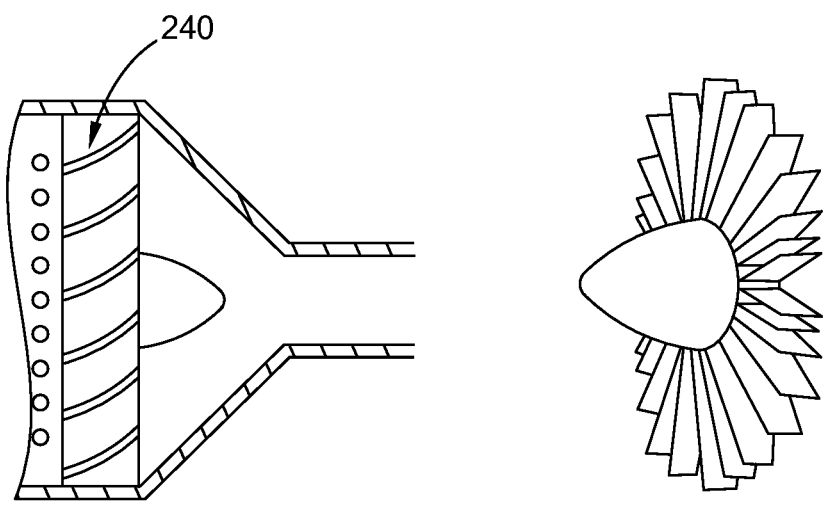
FIG. 4 is a side cross-sectional view illustrating yet another form of a susceptor installed within a heated fluid flow application according to the teachings of the present disclosure.
Figure 5:
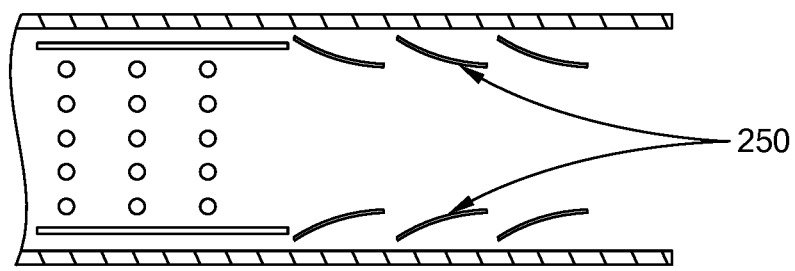
FIG. 5 is a side cross-sectional view illustrating still another form of a susceptor installed within a heated fluid flow application according to the teachings of the present disclosure.
Figure 6:
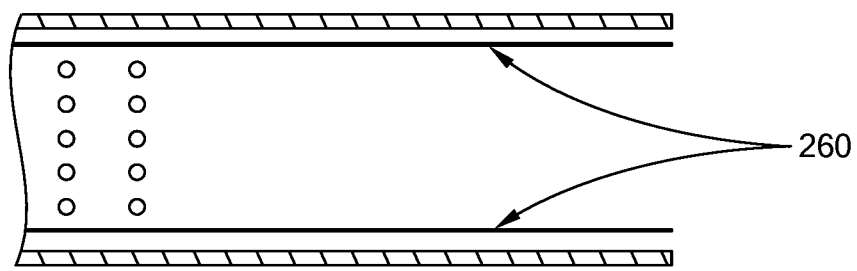
FIG. 6 is a side cross-sectional view illustrating another form of a susceptor installed within a heated fluid flow application according to the teachings of the present disclosure.
Figure 7:
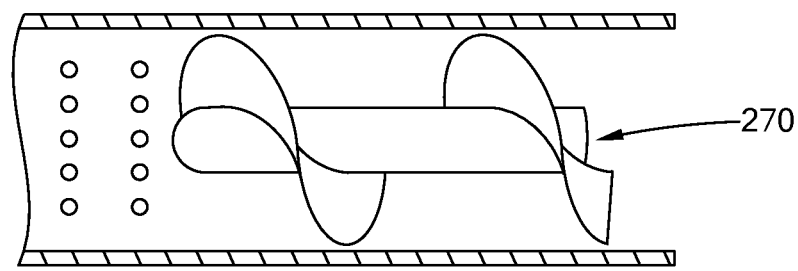
FIG. 7 is a side cross-sectional view illustrating another form of a susceptor installed within a heated fluid flow application according to the teachings of the present disclosure.

Referring to FIGS. 2A and 2B, one form of a susceptor used within a fluid flow application is illustrated and generally indicated by reference numeral 200. As shown, conduit 202 includes a susceptor 200 positioned therein and can be adapted into an fluid flow system or exhaust system such as the example shown with respect to FIG. 1. The conduit 202 is operable for carrying a fluid flow and includes, in this example, a cone wall 204, a can wall 208, and a pipe wall 206. The susceptor 200 is disposed within the conduit 202 and more specifically along cone walls 204, can walls 208, and pipe walls 206 defining an outer boundary of the conduit 202 and configured to allow for fluid flow through the conduit 202.

As further shown, at least one heating element 210 is positioned proximate the conduit 202 to heat the fluid flow. It should be understood that any form of heater may be employed with the teachings of the present disclosure. The susceptor 200 is a relatively thin-walled element as shown, as compared with the conduit 202, such that it can absorb radiant energy that would otherwise be absorbed by the cone walls 204, the can walls 208, and the pipe walls 206. In this exemplary form, the various walls 204, 206, and 208 have a higher thermal mass and would not transfer as much heat to the flow since some of its heat would be lost to the outside environment, for example, through convection or conduction through an insulating jacket. The susceptor 200 can be supported by and spaced apart from the cone walls 204, the can wall 208, and the pipe walls 206 according to application requirements by structural supports 212. In another form, the susceptor 200 includes a reflective material (not shown) adapted to reduce heat transfer away from the susceptor. In yet another form, the susceptor 200 can be isolated from one or all of the walls 204, 206, 208 of the conduit 202.

In another form, a diesel engine exhaust system includes a conduit 202 adapted to carry exhaust fluid flow positioned upstream from a catalyst system of the diesel exhaust system. At least one heating element 210 is disposed proximate an outer wall defining at least a portion of the conduit 202. In this form, the susceptor 200 is arranged within the conduit 202 and is adapted to absorb radiant energy from being absorbed by the outer wall of the conduit 202.

In one form as shown in FIGS. 2A and 2B, the conduit 202 includes a plurality of heating elements 210 provided to heat the fluid flow. Furthermore, the plurality of heating elements 210 may be disposed downstream of a heater and adapted to increase the temperature of the flow downstream of the heater during one or more time periods. In another form, the susceptor 200 is adapted to absorb radiant energy from at least one heating element 210 and inhibit the radiant energy from being absorbed by at least one heating element 210 adjacent to the heating element 210 in which the susceptor 200 is absorbing radiant energy.

In another form, a support member 212 is disposed between at least one heating element 210 and another structural member that is exposed to the fluid flow. For example, the susceptor 200 may serve as the support structure for the heating elements 210. In addition, the susceptor 200 serves the purpose of inhibiting or preventing radiant energy from being absorbed by a wall of a conduit that houses controls and switching hardware or other components that would absorb radiant energy in the absence of susceptor 200.

The advantage of such a susceptor 200 is generally faster and thus more efficient heating of the fluid and any downstream components. In one exemplary application of an exhaust heating system, the time to heat an exhaust gas after-treatment catalyst to temperature can be desired. Typically, upon a cold start-up of the system, current catalysts are not effective until they reach a threshold temperature. Until this temperature is reached, the after-treatment system is not as effective in treating the exhaust (for example, to remove NOx with an SCR Catalyst). By increasing the rate of temperature rise of the catalyst, the time of operation of an engine without an optimally functioning exhaust gas after-treatment system can be decreased and the total amount of pollution emitted by the engine and after-treatment system can likewise be reduced with the use of a susceptor in accordance with the teachings of the present disclosure.

Alternate forms of the susceptor are shown in FIGS. 3 through 7 with concentric louvres 230, radial blades 240 (similar to a compressor stage), circumferential fins 250, a liner 260, or a helical member 270. It should be understood that these alternate forms of susceptors are merely exemplary and that a variety of geometries and materials may be employed to function as a susceptor in fluid flow heating applications in order to increase rates of heating in accordance with the teachings of the present disclosure.

Additional variations of a susceptor may include, by way of example, improving susceptor efficiency by making its side facing the can or pipe wall out of a reflecting material or by insulating the face from the walls of the conduit. This would help limit heat from transferring from the susceptor and into the ambient air through the can wall and instead transfer it back into the exhaust gas. To reduce heat loss to surrounding components/air, the susceptor should be appropriately isolated from the can wall and/or heating elements.

Additionally, a susceptor could be placed between the can wall and the elements to allow a thicker sheet metal can for better mechanical durability (if the trade-off between thermal performance and structural robustness is an issue).

Further, a susceptor with an insulating material between it and the can wall could reduce the need for another insulating device on the outside of the heater. Alternately, the susceptor could be paired with an insulating blanket (not shown) for extra thermal insulation, especially in very cold conditions.

Accordingly, a variety of different forms of heaters, sensors, control systems, and related devices and methods have been disclosed herein for use in fluid flow systems. Many of the different forms can be combined with each other and may also include additional features specific to the data, equations, and configurations as set forth herein. Such variations should be construed as falling within the scope of the present disclosure.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A conduit for use in carrying a fluid flow, the conduit comprising:
    at least one wall defining an outer boundary of a flow pathway of the conduit and configured to allow for fluid to flow through the conduit along a longitudinal flow path about which the at least one wall is disposed;
    at least one heating element positioned within the flow pathway operable for heating the fluid flow flowing along the longitudinal flow path through the flow pathway; and
    a susceptor arranged relative to the longitudinal flow radially between the at least one heating element and the at least one wall and about a majority of a perimeter of the flow pathway, the susceptor adapted to absorb radiant energy from the at least one heating element and inhibit the radiant energy from radiating radially outward relative to the longitudinal flow path and being absorbed by the at least one wall of the conduit.

2. The conduit according to claim 1, wherein the at least one heating element comprises a plurality of heating elements adapted to heat the fluid flow.

3. The conduit according to claim 2, wherein the plurality of heating elements includes a first heating element and a second heating element adjacent to the first heating element, wherein the susceptor is adapted to inhibit radiant energy that is emitted from the first heating element from being absorbed by the second heating element.

4. The conduit according to claim 1, wherein the susceptor provides a support structure to the at least one heating element.

5. The conduit according to claim 1, wherein the susceptor is supported by and spaced apart from the at least one wall of the conduit by a support member.

6. The conduit according to claim 1, wherein the susceptor comprises at least one susceptor wall disposed inside the at least one wall of the conduit, wherein the susceptor wall is thinner than a thickness of the at least one wall of the conduit.

7. The conduit according to claim 1, wherein the susceptor comprises a reflective material configured to reduce radiant heat from transferring away from the susceptor and into the at least one wall.

8. The conduit according to claim 1, wherein the susceptor is isolated from the at least one wall of the conduit.

9. The conduit according to claim 1, wherein the susceptor comprises a configuration selected from the group consisting of concentric louvres, radial blades, circumferential fins, a liner, a helical member, and combinations thereof.

10. The conduit according to claim 1, further comprising a second heating element positioned in the fluid flow and downstream of the at least one heating element.

11. A diesel engine exhaust system comprising:
a conduit adapted to carry exhaust fluid flow, the conduit positioned upstream from a catalyst system of the diesel exhaust system, an outer wall of the conduit defining an outer boundary of a flow pathway of the conduit and configured to allow the exhaust fluid to flow through the conduit along a longitudinal flow path about which the outer wall of the conduit is disposed;
at least one heating element disposed within the flow pathway; and
a susceptor arranged relative to the longitudinal flow path radially between the at least one heating element and the outer wall of the conduit and about a majority of a perimeter of the flow pathway, the susceptor being adapted to absorb radiant energy from the at least one heating element and inhibit the radiant energy from radiating radially outward relative to the longitudinal flow path and being absorbed by the outer wall of the conduit.

12. The diesel engine exhaust system according to claim 11, wherein the at least one heating element comprises a plurality of heating elements adapted to heat the fluid flow.

13. The diesel engine exhaust system according to claim 11, wherein the susceptor provides a support structure to the at least one heating element.

14. The diesel engine exhaust system according to claim 11, wherein the susceptor comprises a configuration selected from the group consisting of concentric louvres, radial blades, circumferential fins, a liner, a helical member, and combinations thereof.

15. The diesel engine exhaust system according to claim 11, wherein the susceptor is spaced apart from the outer wall by a support member.

16. The diesel engine exhaust system according to claim 11, wherein the susceptor comprises a reflective material configured to reduce radiant heat from transferring away from the susceptor and into the outer wall of the conduit.

17. The diesel engine exhaust system according to claim 11, wherein the susceptor comprises at least one susceptor wall disposed inside the outer wall of the conduit, wherein the at least one susceptor wall is thinner than a thickness of the outer wall of the conduit.

18. The diesel engine exhaust system according to claim 11, wherein the susceptor is isolated from the outer wall of the conduit.

19. The diesel engine exhaust system according to claim 11, further comprising insulation between the susceptor and the outer wall of the conduit.

20. The diesel engine exhaust system according to claim 11, wherein the susceptor is paired with an insulating blanket.

* * * * *